(12) United States Patent
Irfan et al.

(10) Patent No.: US 10,493,400 B2
(45) Date of Patent: Dec. 3, 2019

(54) PROCESS FOR DEHUMIDIFYING MOIST GAS MIXTURES

(71) Applicant: Evonik Degussa GmbH, Essen (DE)

(72) Inventors: Muhammad Irfan, Rodenbach (DE); Jörn Rolker, Alzenau (DE); Rolf Schneider, Gründau-Rothenbergen (DE)

(73) Assignee: Evonik Degussa GmbH, Essen (DE)

( * ) Notice: Subject to any disclaimer, the term of this patent is extended or adjusted under 35 U.S.C. 154(b) by 178 days.

(21) Appl. No.: 15/619,561

(22) Filed: Jun. 12, 2017

(65) Prior Publication Data

US 2017/0354924 A1     Dec. 14, 2017

(30) Foreign Application Priority Data

Jun. 14, 2016   (EP) ..................... 16174299

(51) Int. Cl.
| | |
|---|---|
| *B01D 53/28* | (2006.01) |
| *B01D 53/26* | (2006.01) |
| *F25B 15/00* | (2006.01) |
| *F24F 3/14* | (2006.01) |
| *F25B 30/04* | (2006.01) |
| *F25B 15/06* | (2006.01) |

(52) U.S. Cl.
CPC .......... *B01D 53/28* (2013.01); *B01D 53/263* (2013.01); *F24F 3/1417* (2013.01); *F25B 15/00* (2013.01); *F25B 30/04* (2013.01); *B01D 2252/2026* (2013.01); *B01D 2252/20473* (2013.01); *B01D 2252/30* (2013.01); *B01D 2252/61* (2013.01); *B01D 2259/4508* (2013.01); *F25B 15/06* (2013.01); *F25B 2339/047* (2013.01)

(58) Field of Classification Search
None
See application file for complete search history.

(56) References Cited

U.S. PATENT DOCUMENTS

| | | |
|---|---|---|
| 1,882,258 A | 10/1932 | Randel |
| 2,516,625 A | 7/1950 | Haury |
| 2,601,673 A | 6/1952 | McMillan et al. |
| 2,802,344 A | 8/1957 | Witherell |
| 3,317,654 A | 6/1964 | Johnson et al. |
| 3,276,217 A | 10/1966 | Bourne et al. |

(Continued)

FOREIGN PATENT DOCUMENTS

| | | |
|---|---|---|
| CA | 2 817 704 | 5/2012 |
| CN | 1076380 A | 9/1993 |

(Continued)

OTHER PUBLICATIONS

Chung et al., Dehumidification of Moist Air With Simultaneous Removal of Selected Indoor pollutants by Triethylene Glycol Solutions in a Packed-Bed Absorber, Separation Science and Technology, 1995, vol. 30, pp. 1807-1832 (Year: 1995).*

(Continued)

*Primary Examiner* — Philip Y Louie
(74) *Attorney, Agent, or Firm* — Law Office of: Michael A. Sanzo, LLC

(57) ABSTRACT

The invention relates to a process for dehumidifying a moist gas mixture and to the absorption medium used in the process. The invention further relates to an apparatus for dehumidifying a moist gas mixture and to the use of said apparatus in the process according to the invention.

7 Claims, 2 Drawing Sheets

(56) References Cited

U.S. PATENT DOCUMENTS

| | | |
|---|---|---|
| 3,580,759 A | 5/1971 | Albertson et al. |
| 3,609,087 A | 9/1971 | Chi et al. |
| 3,927,151 A | 12/1975 | Ishmail |
| 4,046,719 A | 9/1977 | Stanaback |
| 4,079,263 A | 3/1978 | Inoue |
| 4,094,957 A | 6/1978 | Sartori et al. |
| 4,106,904 A | 8/1978 | Oude Alink et al. |
| 4,112,051 A | 9/1978 | Sartori et al. |
| 4,152,900 A | 5/1979 | Chopra et al. |
| 4,152,901 A | 5/1979 | Munters |
| 4,201,721 A | 5/1980 | Hallgren |
| 4,217,238 A | 8/1980 | Sartori et al. |
| 4,251,494 A | 2/1981 | Say |
| 4,360,363 A | 11/1982 | Ferrin et al. |
| 4,405,579 A | 9/1983 | Sartori et al. |
| 4,405,586 A | 9/1983 | Sartori et al. |
| 4,466,915 A | 8/1984 | Lai |
| 4,489,563 A | 12/1984 | Kalina |
| 4,524,587 A | 6/1985 | Kantor |
| 4,525,294 A | 6/1985 | Sartori et al. |
| 4,605,743 A | 8/1986 | Malz et al. |
| 4,643,000 A | 2/1987 | Rheinfelder |
| 4,701,530 A | 10/1987 | Swearingen et al. |
| 4,714,597 A | 12/1987 | Trevino |
| 4,889,938 A | 12/1989 | Kristen et al. |
| 4,941,324 A | 7/1990 | Peterson et al. |
| 5,016,445 A | 5/1991 | Wehr |
| 5,126,189 A | 6/1992 | Tanny et al. |
| 5,186,009 A | 2/1993 | Rockenfeller |
| 5,186,010 A | 2/1993 | Wehr |
| 5,245,070 A | 9/1993 | Nishikawa |
| 5,255,534 A | 10/1993 | Ryan |
| 5,303,565 A | 4/1994 | Pravada |
| 5,390,509 A | 2/1995 | Rockenfeller et al. |
| 5,583,270 A | 12/1996 | Nishiguchi |
| 5,873,260 A | 2/1999 | Linhardt et al. |
| 6,117,963 A | 9/2000 | Boinowitz et al. |
| 6,128,917 A | 10/2000 | Riesch et al. |
| 6,130,347 A | 10/2000 | Julius et al. |
| 6,155,057 A | 12/2000 | Angell et al. |
| 6,165,433 A | 12/2000 | Chakravarti et al. |
| 6,184,433 B1 | 2/2001 | Harada et al. |
| 6,395,948 B1 | 5/2002 | Hope et al. |
| 6,423,282 B1 | 7/2002 | Araki et al. |
| 6,475,370 B2 | 11/2002 | Lehmann et al. |
| 6,672,099 B1 | 1/2004 | Yoshimi et al. |
| 6,680,047 B2 | 1/2004 | Klaveness et al. |
| 6,727,015 B1 | 4/2004 | Putter et al. |
| 7,419,646 B2 | 9/2008 | Cadours et al. |
| 7,435,318 B2 | 10/2008 | Arlt et al. |
| 7,638,636 B2 | 12/2009 | Zhou et al. |
| 7,666,813 B2 | 2/2010 | Hoefer et al. |
| 7,754,053 B2 | 7/2010 | Maase |
| 7,827,820 B2 | 11/2010 | Weimer et al. |
| 7,998,714 B2 | 8/2011 | Gellett et al. |
| 8,069,687 B2 | 12/2011 | Jork et al. |
| 8,167,983 B2 | 5/2012 | Seiler et al. |
| 8,277,615 B2 | 10/2012 | Ruffert et al. |
| 8,318,117 B2 | 11/2012 | Lichtfers et al. |
| 8,357,344 B2 | 1/2013 | Bouillon et al. |
| 8,362,095 B2 | 1/2013 | Schwab et al. |
| 8,382,962 B2 | 2/2013 | Massonne et al. |
| 8,470,079 B2 | 6/2013 | Agar et al. |
| 8,500,867 B2 | 8/2013 | Seiler et al. |
| 8,500,892 B2 | 8/2013 | Seiler et al. |
| 8,506,839 B2 | 8/2013 | Shiflett et al. |
| 8,523,978 B2 | 9/2013 | Rojey et al. |
| 8,603,226 B2 | 12/2013 | Garcia Andarcia et al. |
| 8,609,572 B2 | 12/2013 | Earl et al. |
| 8,623,123 B2 | 1/2014 | Seiler et al. |
| 8,664,460 B2 | 3/2014 | Earle et al. |
| 8,696,928 B2 | 4/2014 | Seiler et al. |
| 8,703,451 B2 | 4/2014 | Haas et al. |
| 8,715,521 B2 | 5/2014 | Shiflett et al. |
| 8,784,537 B2 | 7/2014 | Seiler et al. |
| 8,809,576 B2 | 8/2014 | Schraven et al. |
| 8,932,478 B2 | 1/2015 | Seiler et al. |
| 9,221,007 B2 | 12/2015 | Rolker et al. |
| 9,409,122 B2 | 8/2016 | Qi et al. |
| 9,630,140 B2 | 4/2017 | Willy et al. |
| 9,840,473 B1 | 12/2017 | Wang et al. |
| 9,878,285 B2 | 1/2018 | Schraven et al. |
| 10,105,644 B2 | 10/2018 | Zehnacker et al. |
| 10,138,209 B2 | 11/2018 | Bahlmann et al. |
| 2002/0169071 A1 | 11/2002 | Sauvage et al. |
| 2002/0198100 A1 | 12/2002 | Mehnert et al. |
| 2003/0085156 A1 | 5/2003 | Schoonover et al. |
| 2004/0016631 A1 | 1/2004 | Madkour |
| 2004/0133058 A1 | 7/2004 | Arlt et al. |
| 2005/0010076 A1 | 1/2005 | Wasserscheid et al. |
| 2005/0070717 A1 | 3/2005 | Wasserscheid et al. |
| 2005/0129598 A1 | 6/2005 | Chinn |
| 2005/0164082 A1 | 7/2005 | Kishi et al. |
| 2005/0202967 A1 | 9/2005 | Hoefer et al. |
| 2005/0245769 A1 | 11/2005 | Kohler et al. |
| 2006/0070919 A1 | 4/2006 | Vallee et al. |
| 2006/0104877 A1 | 5/2006 | Cadours et al. |
| 2006/0128996 A1 | 6/2006 | Vaultier et al. |
| 2006/0150665 A1 | 7/2006 | Weimer et al. |
| 2006/0197053 A1 | 9/2006 | Shiflett et al. |
| 2006/0251961 A1 | 11/2006 | Olbert et al. |
| 2006/0264645 A1 | 11/2006 | Zhou et al. |
| 2007/0004903 A1 | 1/2007 | Hoff et al. |
| 2007/0095645 A1 | 5/2007 | Masse |
| 2007/0142685 A1 | 6/2007 | Elomari et al. |
| 2007/0144186 A1 | 6/2007 | Shiflett et al. |
| 2007/0164462 A1 | 7/2007 | Liu et al. |
| 2007/0264180 A1 | 11/2007 | Carrette et al. |
| 2007/0286783 A1 | 12/2007 | Carrette et al. |
| 2008/0028777 A1 | 2/2008 | Boesmann et al. |
| 2008/0114105 A1 | 5/2008 | Hell et al. |
| 2008/0283383 A1 | 11/2008 | Ruffert et al. |
| 2008/0306319 A1 | 12/2008 | Earle et al. |
| 2009/0029121 A1 | 1/2009 | Hammermann et al. |
| 2009/0029887 A1 | 1/2009 | Schwab et al. |
| 2009/0036334 A1 | 2/2009 | Schwab et al. |
| 2009/0139232 A1 | 6/2009 | Collis |
| 2009/0170734 A1 | 7/2009 | Schwab et al. |
| 2009/0199709 A1 | 8/2009 | Rojey et al. |
| 2009/0211447 A1 | 8/2009 | Lichtfers et al. |
| 2009/0326228 A1 | 12/2009 | Vaultier et al. |
| 2010/0011958 A1 | 1/2010 | Cadours et al. |
| 2010/0016205 A1 | 1/2010 | Schwab |
| 2010/0029519 A1 | 2/2010 | Schwab et al. |
| 2010/0071557 A1 | 3/2010 | Seiler et al. |
| 2010/0084597 A1 | 4/2010 | Schwab et al. |
| 2010/0086983 A1 | 4/2010 | Gellett et al. |
| 2010/0095703 A1 | 4/2010 | Jork et al. |
| 2010/0104490 A1 | 4/2010 | Bouillon et al. |
| 2010/0132551 A1 | 6/2010 | Bouillon et al. |
| 2010/0186590 A1 | 7/2010 | Vorberg et al. |
| 2010/0192770 A1 | 8/2010 | Andarcia |
| 2010/0269528 A1 | 10/2010 | Gerhard et al. |
| 2010/0288126 A1 | 11/2010 | Agar et al. |
| 2010/0300870 A1 | 12/2010 | Massonne et al. |
| 2010/0324318 A1 | 12/2010 | Prakash et al. |
| 2010/0326126 A1 | 12/2010 | Seiler et al. |
| 2011/0000236 A1 | 1/2011 | Seiler et al. |
| 2011/0081287 A1 | 4/2011 | Bouillon et al. |
| 2011/0094381 A1 | 4/2011 | Lichtfers et al. |
| 2011/0118504 A1 | 5/2011 | Haas et al. |
| 2011/0135549 A1 | 6/2011 | Lichtfers et al. |
| 2011/0185901 A1 | 8/2011 | Jacquin et al. |
| 2011/0247494 A1* | 10/2011 | Dinnage ............ B01D 53/1456 95/92 |
| 2011/0256043 A1 | 10/2011 | Blair et al. |
| 2011/0309295 A1 | 12/2011 | Joh et al. |
| 2012/0011886 A1 | 1/2012 | Shiflett et al. |
| 2012/0017762 A1 | 1/2012 | Seiler et al. |
| 2012/0024756 A1 | 2/2012 | Verma et al. |
| 2012/0080644 A1 | 4/2012 | Seiler et al. |
| 2012/0117991 A1 | 5/2012 | Rached |
| 2012/0186993 A1 | 7/2012 | Huang et al. |
| 2012/0247144 A1 | 10/2012 | Seiler et al. |

(56) References Cited

U.S. PATENT DOCUMENTS

| | | |
|---|---|---|
| 2012/0308458 A1 | 12/2012 | Seiler et al. |
| 2012/0315366 A1 | 12/2012 | Zehnacher et al. |
| 2013/0011314 A1 | 1/2013 | Porcheron et al. |
| 2013/0023712 A1 | 1/2013 | Porcheron et al. |
| 2013/0026073 A1 | 1/2013 | Martinez Palou et al. |
| 2013/0031930 A1 | 2/2013 | Seiler et al. |
| 2013/0031931 A1 | 2/2013 | Seiler et al. |
| 2013/0118350 A1 | 5/2013 | Rolker et al. |
| 2013/0133327 A1 | 5/2013 | Milam et al. |
| 2013/0219949 A1 | 8/2013 | Seiler et al. |
| 2013/0247758 A1 | 9/2013 | Seiler et al. |
| 2013/0255287 A1 | 10/2013 | Forkosh |
| 2013/0255496 A1 | 10/2013 | Zhang et al. |
| 2013/0263743 A1 | 10/2013 | Seiler et al. |
| 2013/0319022 A1 | 12/2013 | Becze et al. |
| 2013/0327084 A1 | 12/2013 | Shiflett et al. |
| 2014/0005344 A1 | 1/2014 | Rinker et al. |
| 2014/0079613 A1 | 3/2014 | Andarcia et al. |
| 2014/0090558 A1 | 4/2014 | Rolker et al. |
| 2014/0091008 A1 | 4/2014 | Hardarce et al. |
| 2014/0105801 A1 | 4/2014 | Rolker et al. |
| 2014/0120016 A1 | 5/2014 | Rolker et al. |
| 2014/0127103 A1 | 5/2014 | Qi et al. |
| 2014/0356268 A1 | 12/2014 | Schraven et al. |
| 2014/0360369 A1 | 12/2014 | Schraven et al. |
| 2015/0024106 A1 | 1/2015 | Huller et al. |
| 2015/0024247 A1 | 1/2015 | Lockett et al. |
| 2015/0125373 A1 | 5/2015 | Willy et al. |
| 2015/0141315 A1 | 5/2015 | Jin |
| 2015/0175738 A1 | 6/2015 | Willy et al. |
| 2015/0175740 A1 | 6/2015 | Willy et al. |
| 2015/0308720 A1* | 10/2015 | Zehnacker ............ C09K 5/047 62/112 |
| 2015/0321139 A1 | 11/2015 | Schraven et al. |
| 2016/0045857 A1 | 2/2016 | Rolker et al. |
| 2016/0115827 A1 | 4/2016 | Rached |
| 2016/0153318 A1 | 6/2016 | Busse et al. |
| 2016/0175766 A1 | 6/2016 | Zehnacker et al. |
| 2017/0022447 A1 | 1/2017 | Atkins et al. |
| 2017/0107449 A1 | 4/2017 | Hruschka et al. |
| 2017/0354921 A1 | 12/2017 | Zehnacker et al. |
| 2017/0354922 A1 | 12/2017 | Zehnacker et al. |
| 2017/0354923 A1 | 12/2017 | Zehnacker et al. |
| 2017/0355680 A1 | 12/2017 | Wang et al. |
| 2017/0355681 A1 | 12/2017 | Bahlmann et al. |
| 2017/0355682 A1 | 12/2017 | Willy et al. |
| 2018/0134987 A1 | 5/2018 | Fedor et al. |
| 2018/0134988 A1 | 5/2018 | Fedor et al. |
| 2018/0148665 A1 | 5/2018 | Goodrich et al. |
| 2018/0169572 A1 | 6/2018 | Zehnacker et al. |
| 2018/0202048 A1* | 7/2018 | Kirste ................. C23C 18/2026 |
| 2018/0216233 A1* | 8/2018 | Kirste .................... C23C 18/26 |

FOREIGN PATENT DOCUMENTS

| | | |
|---|---|---|
| CN | 102335545 | 2/2012 |
| CN | 102031202 | 5/2012 |
| CN | 105061496 A | 11/2015 |
| DE | 400 488 | 8/1924 |
| DE | 633 146 | 7/1936 |
| DE | 737031 | 7/1943 |
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2010 001 070 | 7/2011 |
| DE | 10 2010 004 779 | 7/2011 |
| DE | 10 2011 055 859 | 6/2013 |
| DE | 10 2013 010 035 | 12/2014 |
| DE | 10 2014 214 670 | 1/2016 |
| DE | 10 2014 214 674 | 1/2016 |
| DE | 10 2014 214 682 | 1/2016 |
| DE | 10 2014 110190 | 1/2016 |
| DE | 10 2015 212 749 | 1/2017 |
| DE | 10 2016 210 481 | 6/2017 |
| DE | 10 2016 204 928 | 9/2017 |
| DE | 10 2016 204 929 | 9/2017 |
| DE | 10 2016 204 930 | 9/2017 |
| DE | 10 2016 204 931 | 9/2017 |
| DE | 10 2016 204 932 | 9/2017 |
| DE | 10 2016 204 937 | 9/2017 |
| EP | 0 033 529 A1 | 1/1981 |
| EP | 0 047 967 | 9/1981 |
| EP | 0 079 767 | 5/1983 |
| EP | 0 187 130 | 7/1986 |
| EP | 0 193 327 | 9/1986 |
| EP | 0 302 020 | 2/1989 |
| EP | 0 558 019 | 2/1993 |
| EP | 0 791 643 | 8/1997 |
| EP | 2 636 715 | 9/2013 |
| EP | 2 940 394 | 11/2015 |
| FR | 670 497 | 11/1929 |
| FR | 2 861 084 | 4/2005 |
| FR | 2 900 841 A1 | 11/2007 |
| GB | 1 306 853 | 2/1973 |
| GB | 1 501 195 | 2/1978 |
| GB | 2 047 681 | 12/1980 |
| GB | 2 528 494 | 1/2016 |
| JP | 33-009879 B | 11/1958 |
| JP | 57-191407 | 11/1982 |
| JP | 61-129019 | 6/1986 |
| JP | 62-73055 | 4/1987 |
| JP | 1-134180 | 5/1989 |
| JP | H01-198679 | 8/1989 |
| JP | 2-298767 | 12/1990 |
| JP | 4-268176 | 9/1992 |
| JP | 6-307730 | 11/1994 |
| JP | 7-167521 | 7/1995 |
| JP | 09 313864 | 12/1997 |
| JP | 2000-202299 | 7/2000 |
| JP | 2001-219164 | 8/2001 |
| JP | 2002-047258 | 2/2002 |
| JP | 2004-44945 | 2/2004 |
| JP | 2006-160969 | 6/2006 |
| JP | 2006-239516 | 9/2006 |
| JP | 2006-282525 | 10/2006 |
| JP | 2010-034301 | 2/2010 |
| JP | 2010-54136 | 3/2010 |
| JP | 2013-051238 | 3/2013 |
| JP | 2013-139425 | 7/2013 |
| JP | 2013-250186 | 12/2013 |
| RU | 2 101 625 | 1/1998 |
| RU | 2 122 642 | 11/1998 |
| RU | 2 183 003 | 5/2002 |
| WO | WO 93/13367 | 7/1993 |
| WO | WO 00/61698 A1 | 10/2000 |
| WO | WO 2002/016671 | 2/2002 |
| WO | WO 2004/016631 | 2/2004 |
| WO | WO 2004/082809 | 9/2004 |
| WO | WO 2006/012097 | 2/2006 |
| WO | WO 2006/048182 | 5/2006 |
| WO | WO 2007/099041 | 9/2007 |
| WO | WO 2007/101397 | 9/2007 |
| WO | WO 2007/138307 | 12/2007 |
| WO | WO 2009/032959 | 3/2009 |
| WO | WO 2009/074535 | 6/2009 |
| WO | WO 2009/133059 | 11/2009 |
| WO | WO 2010/037109 | 4/2010 |
| WO | WO 2010/136783 | 12/2010 |
| WO | WO 2011/131552 | 10/2011 |
| WO | WO 2012/082093 | 6/2012 |
| WO | WO 2012/110987 | 8/2012 |
| WO | WO 2012/150051 | 11/2012 |
| WO | WO 2013/041300 | 3/2013 |
| WO | WO 2013/050230 | 4/2013 |
| WO | WO 2013/050242 | 4/2013 |
| WO | WO 2013/072147 | 5/2013 |
| WO | WO 2015/000637 | 1/2015 |
| WO | WO 2015/079262 | 6/2015 |
| WO | WO 2016/005769 | 1/2016 |

(56) References Cited

FOREIGN PATENT DOCUMENTS

| WO | WO 2016/189330 | 12/2016 |
|---|---|---|
| WO | WO 2016/189333 | 12/2016 |
| WO | WO 2017/005538 | 1/2017 |

OTHER PUBLICATIONS

Kanakubo, et al., "$CO_2$ solubility in and physical properties for ionic liquid mixtures of 1-butyl-3-methylimidazolium acetate and 1-butyl-3-methylimidazolium bis(trifluoromethanesulfonyl)amide," *Journal of Molecular Liquids* 217:112-119 (2016); available online Feb. 12, 2016.

Krannich, et al., "Characterization of Six Hygroscopic Ionic Liquids with Regard to Their Suitability for Gas Dehydration: Density, Viscosity, Thermal and Oxidative Stability, Vapor Pressure, Diffusion Coefficient, and Activity Coefficient of Water," *Journal of Chemical Engineering & Data* 61:1162-1176 (Feb. 2016).

Kriebel, et al., "Absorption, 2. Design of Systems and Equipment," Ulmann's Encyclopedia of Industrial Chemistry, vol. 1, pp. 75-90 (2008).

Lall-Ramnarine, et al., "Probing the Physical Properties, Synthesis and Cellulose Dissolution Ability of Dialkyl Phosphate Ionic Liquids," *Phosphorous, Sulfur, and Silicon* 190:891-895 (2015).

Lungwitz, Ralf, "Ionische Flüssigkeiten—Polarität und Wechselwirkungen mit silikatischen Oberflächen," Dissertation Technische Universitat Chemnitz (Nov. 2011); with English language translation of relevant parts.

English language translation of Mao, et al., "Development and Application of New Technique for Recovery of Low Partial Pressure Carbon Dioxide," *Journal of Chemical Industry & Engineering* 25(3):12-15 (Jun. 2004).

English language translation of Rolker, et al., "Separation of carbon dioxide from flue gases by means of absorption," *Chemie Ingenieur Tecknik* 78(4):416-424 (Jul. 2006).

OECD Guidelines for the Testing of Chemicals, Test No. 104, items 14-19, (adopted May 1981).

Projekt der Deutschen Bundesstiftung: Gasreinigung mit ionischen Flüssigkeiten Umwelt; Endbericht (Sep. 2009); with English language translation of relavant parts.

English language translation of Xiao, "Study on Technique for Recovery of Carbon Dioxide from Flue Gas," *Modern Chemical Industry* 24(5):47-49 (May 2004).

European Search Report completed Nov. 21, 2016 for counterpart European application EP 16 17 4299 with a partial english language machine translation attached.

U.S. Appl. No. 14/124,472, filed Dec. 6, 2013, 2014-0090558 A1, Apr. 3, 2014, Rolker.

U.S. Appl. No. 14/373,350, filed Jul. 19, 2014, 2014-0356268 A1, Dec. 4, 2014, Schraven.

U.S. Appl. No. 14/973,084, filed Dec. 17, 2015, 2016-0175766 A1, Jun. 23, 2016, Zehnacker.

U.S. Appl. No. 15/486,300, filed Apr. 13, 2017, Bahlmann.

U.S. Appl. No. 15/619,566, filed Jun. 12, 2017, Willy.

U.S. Appl. No. 15/619,567, filed Jun. 12, 2017, Wang.

U.S. Appl. No. 15/619,573, filed Jun. 12, 2017, Zehnacker.

U.S. Appl. No. 15/619,577, filed Jun. 12, 2017, Zehnacker.

U.S. Appl. No. 15/619,584, filed Jun. 12, 2017, Zehnacker.

Philippine Search Report and Written Opinion for corresponding Philippine application No. 1/2017/000172 filed Jun. 2017.

"Mutual Solubility of Water and Pyridine Derivatives" by Richard M. Stephenson, *J. Chem. Eng. Data* 38, p. 428-431, (Jul. 1993).

"Review of Organic Functional Groups: Introduction to Medicinal Organic Chemistry" by Thomas L. Lemke, Lippincott Williams & Wilkins, p. 40 (2003).

"Review of Organic Functional Groups: Introduction to Medicinal Organic Chemistry" by Thomas L. Lemke, Lippincott Williams & Wilkins, p. 39 (2003).

Brennecke, et al., "Ionic Liquids: Innovative Fluids for Chemical Processing," *AIChE Journal* 47(11):2384-2389 (Nov. 2001).

Chua, et al., "Improved Thermodynamic Property Fields of LiBr—$H_2O$ Solution," *International Journal of Refrigeration* 23:412-429 (Sep. 2000).

De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data*, American Chemical Society, US 48(1):18-22 (Jan. 2003).

De Lucas, et al., "Absorption of Water Vapor into Working Fluids for Absorption Refrigeration Systems," *Industrial & Engineering Chemistry Research*, American Chemical Society, US 46(1):345-350 (2007); (published online Dec. 2006).

Domanska, et al., Solubility of 1-Alkyl-3-ethylimidazolium-Based Ionic Liquids in Water and 1-Octanol, *J. Chem. Eng. Data* 53:1126-1132 (Apr. 2008).

Galán, et al., "Solvent Properties of Functionalized Ionic Liquids for $CO_2$ Absorption," *IChemE* 85(A1):31-39 (Jan. 2007).

Glebov, et al., "Experimental Study of Heat Transfer Additive Influence on the Absorption Chiller Performance," *International Journal of Refrigeration* 25:538-545 (Aug. 2002).

Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng.* 23(1):113-116 (Jan. 2006).

Kim, et al., "Performance Evaluation of Absorption Chiller Using LiBr—$H_2N(CH_2)_2OH$—$H_2O$, LiBr—$HO(CH_2)_3OH$—$H_2O$, and LiBr—$(HOCH_2CH_2NH$—$H_2O$ as Working Fluids," *Applied Thermal Engineering* 19:217-225 (Feb. 1999).

Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (Apr. 2004).

Li, et al., "Correlation and Prediction of the Solubility of $CO_2$ and $H_2S$ in an Aqueous Solution of 2-Piperidineethanol and Sulfolane," *Ind. Eng. Chem. Res.* 37:3098-3104 (May 1998).

Liu, et al., The physical properties of aqueous solution of room-temperature ionic liquids based on imidazolium:Database and Evaluation, *J. Mol. Liquids* 140:68-72 (Jan. 2008).

Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007).

Perez-Blanco, "A Model of an Ammonia-Water Falling Film Absorber," ASHRAE Transactions vol. 94, pp. 467-483, 1988; Presented at the winter meeting in Dallas Texas of the American Society of Heating, Refrigerating and Air-Conditioning Engineers, Inc. (1988).

Wasserscheid, et al., "Ionic Liquids—New "Solutions" for Transition Metal Catalysis," *Angew. Chem. Int. Ed.* 39:3772-3789 (Nov. 2000).

Wu, et al., "Novel Ionic Liquid Thermal Storage for Solar Thermal Electric Power Systems," *Proceeding of Solar Forum. Solar Energy: The Power to Choose* (Apr. 21-25, 2001).

Yoon, et al., "Cycle Analysis of Air-Cooled Absorption Chiller Using a New Working Solution," *Energy* 24:795-809 (Sep. 1999).

Zhang, et al., "Screening of ionic Liquids to Capture CO2 by COSMO-RS and Experiments," *AIChE Journal* 54(10):2171-2728 (Oct. 2008).

Zhou, The Vapor Surfactant Theory of Absorption and Condensation Enhancement, *Proc. Int. Sorption Heat Pump Conference*, (Sep. 24-27, 2002).

Ziegler, et al., "Heat-Transfer Enhancement by Additives," *International Journal of Refrigeration* 19:301-309 (Jun. 1996).

Ziegler, et al., "Multi-effect absorption chillers," *Rev. Int. Froid* 16(5):301-311 (1993).

Ziegler, et al., "Recent developments and future prospects of sorption heat pump systems," *Int. J. Therm. Sci.* 38:191-208 (Mar. 1999).

English language translation of the European Search Report for corresponding application EP 16 17 4299, filed Jun. 14, 2016.

(56) References Cited

OTHER PUBLICATIONS

Kuhlmann, et al., "Imidazolium dialkylphosphates—a class of versatile, halogen-free and hydrolytically stable ionic liquids," *Green Chem.* 9:233-242 (2007).
Li, et al., "Efficient absorption of ammonia with hydroxyl-functionalized ionic liquids," *RCS Adv.* 5:81362-81370 (2015).
U.S. Appl. No. 15/742,436, filed Jan. 5, 2018, Zehnacker.
Blachly, et al., "Stabilization of Monoethanolmine Solutions in Carbon Dioxide Scrubbers," *J. Chem. Eng. Data* 11(3):401-403 (Jul. 1966).
Call, "Aminoxyle-eine Klasse stabiler," *Pharmazie in unserer Zeit* 3:83-95 (Jan. 1977); with English language translation attached.
Kirchhoff, et al., "Triacetoneamine Derivatives Industrial Applications and Recent Developments," pp. 1-9, Addcon World '99 (Two-Day Conference, Oct. 1999).
Lewin, et al., "Molecular Features Associated with Polyamine Modulation of NMDA Receptors," *J. Med. Chem.* 41:988-995 (published online Feb. 1998).
Luo, et al., "Dehumidification performance of [EMIM]BF$_4$," *Applied Thermal Engineering* 31(14-15):2772-2777 (Oct. 2011).
Luo, et al., "Investigation of feasibility of ionic liquids used in solar liquid desiccant air conditioning system," *Solar Energy* 86(9):2781-2724 (Sep. 2012).
Satori, et al., "Sterically Hindered Amines for CO$_2$ Removal from Gases," *Ind. Eng. Chem. Fundam.* 22(2):239-249 (accepted Jan. 1983).
Gerald Scott, Develpoments in polymer stabilization-5, Chapter 3: Antioxidant action of sterically hindered amines and related compounds, Shlyapintokh and Ivanor; pp. 41-70, Applied Science Publishers (1982).
Shao & Stangeland, "Amines Used in CO$_2$ Capture—Health and Environmental Impacts," Bellona Report (Sep. 2009).
Ulmann's Encyclopedia of Industrial Chemistry, 5th Edition, vol. 83, "Antioxidants" pp. 91-104 (1985).
Wellner, et al., "Entwässerung ionischer Flüssigkeiten in einem Fallfilmverdampfer," *Chemie Ingenieur Technik* 83(9):1493-1501(Jul. 2011); with complete English language translation.
Yunus, "Gaslöslichkeit in ionischen Flüssigkeiten," IsoSORP Application Note Nr. 4:1-2 (Feb. 2014); with complete English language translation.
Encylopedia of Chemical Process and Design, Ed. John J. McKetta, vol. 32. Marcel Deckker, Inc. (1990) pp. 123-126.
Abelló, et al., "Supported choline hydroxide (ionic liquid) as heterogeneous catalyst for aldol condensation reactions," *Chem. Comm.* 1096-1097 (2004).
Alcade, et al., "A Simple Halide-to-Anion Exchange Method for Heteroaromatic Salts and Ionic Liquids," *Molecules* 17:4007-4027 (2012).
Cole, et al., "Novel Bronsted Acidic Ionic Liquids and Their Use as Dual Solvent—Catalysts," *J. Am. Chem. Soc.* 124:5962-5963 (2002).
Ishiguro, et al., "Structure, solvation, and acid-base property in ionic liquids," *Pure Appl. Chem.* 82(10):1927-1941 (Aug. 2010).
Manic, et al., "Extraction of Free Fatty Acids from Soybean Oil Using Ionic Liquids or Poly(ethyleneglycol)s," *AIChE* 57(5):1344-1355 (May 2011).
Nockemann, et al., "Task-Specific Ionic Liquid for Solubilizing Metal Oxides," *J. Phys. Chem.* 110(42): 20978-20992 (Oct. 2006).
Smiglak, et al., "New hydrogen carbonate precursors for efficient and byproduct-free synthesis of ionic liquids based on 1,2,3,-tirmethylimidazolium and N,N-dimethylpyrrolidinium cores," *Green Chem.* 12:491-501 (2010).
Zhao, et al., "Review: Use of ionic liquids as 'green' solvents for extractions," *J. Chem. Technol. Biotechnol.* 80: 1089-1096 (published online May 2005).
Office Action for U.S. Appl. No. 15/619,577, dated Feb. 14, 2019.
Response to Office Action dated Feb. 14, 2019 for U.S. Appl. No. 15/619,577, filed May 13, 2019.
Office Action for U.S. Appl. No. 14/973,084, dated Nov. 1, 2017. Application is now abandoned. Application was published as US 2016/0175766.
Office Action for U.S. Appl. No. 15/619,566, dated May 29, 2018. Application is now abandoned. Application was published as US 2017/0355682.
Office Action for U.S. Appl. No. 15/619,573, dated Feb. 14, 2019.
Response to Office Action dated Feb. 14, 2019 for U.S. Appl. No. 15/619,573, filed May 13, 2019.
U.S. Appl. No. 16/300,466, filed Nov. 9, 2018, Wang.
U.S. Appl. No. 15/742,436, filed Jan. 15, 2018, US 2018/0169572 A1, Jun. 21, 2018, Zehnacker.
Notice of Allowance dated Aug. 7, 2019 for co-pending U.S. Appl. No. 15/619,573.
Notice of Allowance dated Aug. 8, 2019 for co-pending U.S. Appl. No. 15/619,577.
Notice of Allowance dated Aug. 12, 2019 for co-pending U.S. Appl. No. 15/742,436.

\* cited by examiner

PROCESS FOR DEHUMIDIFYING MOIST GAS MIXTURES

CROSS REFERENCE TO RELATED APPLICATIONS

The present application claims priority under 35 USC § 119 to European application, EP 16174299.4, filed on Jun. 14, 2016, the contents of which is incorporated herein by reference in its entirety.

FIELD OF THE INVENTION

The invention relates to a process for dehumidifying a moist gas mixture and to the absorption medium used in the process. The invention further relates to an apparatus for dehumidifying a moist gas mixture and to the use of said apparatus in the process according to the invention.

BACKGROUND OF THE INVENTION

Dehumidification of moist gas mixtures is necessary in a multitude of technical fields. For instance ventilation and air conditioning of buildings or vehicles generally necessitates not only cooling but also dehumidification of the air since the air to be cooled is often so humid that during cooling to the desired temperature the temperature falls below the dew point temperature. Hence in conventional air conditioning systems dehumidification of the air accounts for a large part of the electricity consumption.

The electricity consumption of air conditioning systems for buildings is reduced by dehumidifying the air by adsorption or absorption of water with a drying medium and subsequently regenerating the water-laden drying medium by heating to a temperature at which the water is desorbed again. Compared to adsorption on a solid absorbent, the advantage of absorption in a liquid absorption medium is that air dehumidification can be carried out with reduced equipment complexity and with less drying medium and that regeneration of the water-laden drying medium using solar heat is easier to carry out.

A further technical field where dehumidifying of moist gas mixtures is employed is the field of absorption chillers (synonymous with "absorption heat pump", principle described in WO 2014/079675 A1). Here, the damp gas mixture is formed during evaporation of water under low pressure. The water vapour thus formed needs to be removed from the moist gas mixture so that said mixture may then be returned to the water evaporation to pass through a new cycle. Here too, absorption in a liquid absorption medium is favoured over adsorption on a solid adsorption medium.

To absorb moisture from ionic liquids the prior art suggests a series of ionic liquids. Thus, DE 10 2010 004 779 A1 mentions 1-ethyl-3-methylimidazolium ethylsulfate, 1-ethyl-3-methylimidazolium methylsulfate, 1-ethyl-3-methylimidazolium diethylphosphate, 1-ethyl-3-methylimidazolium methylsulfonate, 1-butyl-3-methylimidazolium bistrifluoromethanesulfonimide, 1-butyl-3-ethylimidazolium chloride for example.

CN 102335545 A describes a series of ionic liquids based on alkyl phosphates, namely inter alia 1,3-dimethyimidazolium dimethylphosphate, 1-ethyl-3-methylimidazolium dimethylphosphate and 1-butyl-3-methylimidazolium dimethylphosphate.

Y. Luo et al., Appl. Thermal Eng. 31 (2011) 2772-2777 proposes using the ionic liquid 1-ethyl-3-methylimidazolium tetrafluoroborate in place of an aqueous solution of lithium bromide for air dehumidification. However, this ionic liquid has the disadvantage of only poor absorption capability.

These and further ionic liquids are also discussed by Krannich et al., J. Chem. Eng. Data 61 (2016), 1162-1176.

Y. Luo et al., Solar Energy 86 (2012) 2718-2724 proposes the ionic liquid 1,3-dimethyimidazolium acetate as an alternative to 1-ethyl-3-methylimidazolium tetrafluoroborate for air dehumidification. The acetates are also discussed by M. Kanakubo et al., J. Mol. Liq. 217 (2016) 112-119.

US 2011/0247494 A1 proposes a further ionic liquid for this purpose, namely 1-ethyl-3-methylimidazolium acetate.

The application of these ionic liquids in absorption chillers is also discussed in WO 2013/050242 A1.

One important criterion for choosing an ionic liquid as absorption medium is the viscosity thereof. It is thus desirable to employ an absorption medium having the lowest possible viscosity since easier flowability of the absorption medium markedly simplifies the use thereof in air dehumidification. In an absorption chiller, in which the absorption medium needs to pumped, a more flowable absorption medium can be transported with reduced energy consumption which markedly enhances the economy of such a chiller. In addition, a lower viscosity also results in fewer outages caused for instance by cavity blockages.

Such blockages also have a further cause: It was observed that many ionic liquids described in the literature show a propensity to precipitate on contact with $CO_2$, thus forming solid deposits. However, the presence of $CO_2$ in the gas streams for dehumidification is in many cases unavoidable and in specific applications, for example dehumidification of natural gas, the proportion of $CO_2$ in the gas stream for dehumidification is very high.

It is accordingly an object of the present inventions to provide an absorption medium which does not exhibit the abovementioned problems, i.e. has the lowest possible viscosity and a low propensity to precipitate on contact with $CO_2$.

An absorption medium which achieves this object has now surprisingly been found.

BRIEF DESCRIPTION OF THE DRAWINGS

FIG. 1 illustrates an embodiment of the apparatus V2/V1 according to the invention.

FIG. 2 illustrates in schematic fashion an absorption chiller into which an apparatus V2 is integrated.

DETAILED DESCRIPTION OF THE INVENTION

Figure 1:
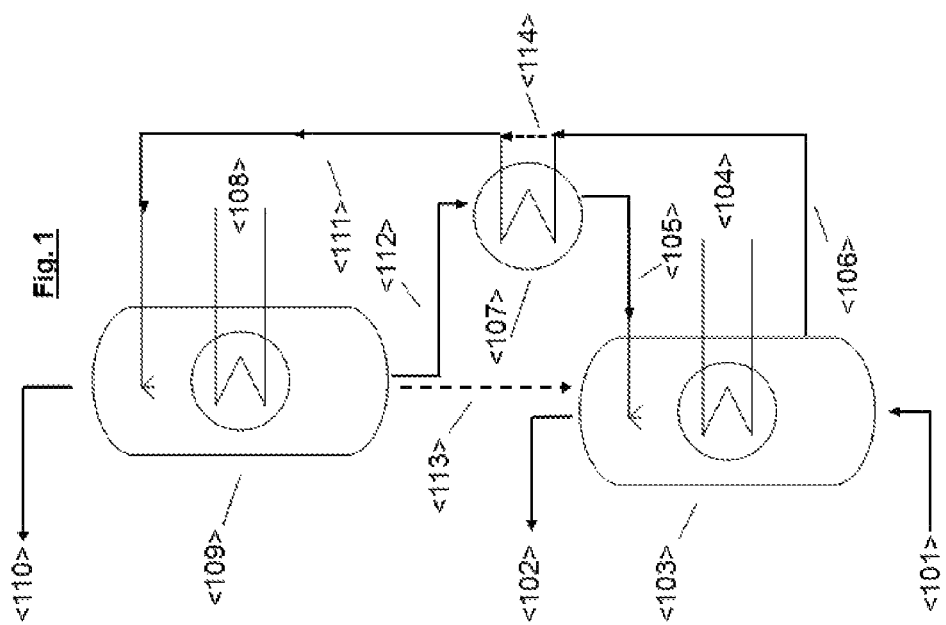
FIG. 1.

The present invention accordingly relates to a process for dehumidifing a moist gas mixture $G_1$, wherein the moist gas mixture $G_1$ is contacted with a liquid absorption medium $A_1$ which comprises a mixture of triethylene glycol and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$ to obtain a gas mixture $G_2$ which has a lower water content compared to moist gas mixture $G_1$ and a liquid absorption medium $A_2$ which has an elevated water content compared to the liquid absorption medium $A_1$, wherein $Q^+$ is a dialkylimidazolium cation in which the alkyl groups each independently of one another have 1 to 6 carbon atoms, wherein $A^-$ is an anion selected from the group consisting of acetate, propionate, $R'SO_3^-$, $HSO_4^-$, $R''SO_4^-$, wherein R', R'' are each independently of one another an alkyl group having 1 to 6 carbon atoms, wherein $R^1$, $R^2$, $R^3$ are each independently of one another an alkyl group having 1 to 6 carbon atoms and $M^+$ is an alkali metal ion, with the proviso that the salt S is not dimethylimidazolium methylsulfonate. Triethylene glycol has CAS number 112-27-6.

"Moist" is to be understood as meaning in the context of the invention "comprising water, in particular water vapour". "Dehumidifying" is to be understood as meaning in accordance with the invention "at least partially removing water".

"At least partially" is to be understood as meaning in the context of the invention "partially or completely".

"Moist gas mixture $G_1$" is accordingly to be understood as meaning in the context of the invention that the gas mixture $G_1$ comprises water, preferably water vapour ("water vapour" is to be understood as meaning water in the gaseous physical state), and that its composition is otherwise not particularly restricted. The water content of the moist gas mixture is not particularly restricted and is in particular from 0.01 vol % to 99.99 vol % ("vol %" indicates the volume of water vapour based on the overall volume of moist gas mixture $G_1$). The composition of the moist gas $G_1$ may otherwise vary depending on the application of the process according to the invention. The moist gas mixture $G_1$ is in particular selected from moist natural gas, moist air (this may be moist indoor air or the moist air resulting from evaporation of water in absorption chillers), preferably moist air. For moist natural gas the water content is in particular from 0.01 vol % to 15.00 vol %, for moist air said content is in particular from 0.01 vol % to 5.00 vol % in the case of moist indoor air or in particular from 95.00 vol % to 99.99 vol %, which is the preferred range, when moist air resulting from evaporation of water in absorption chillers is concerned.

The gas mixture $G_1$ in particular comprises $CO_2$. The gas mixture $G_1$ preferably comprises $CO_2$ in a proportion of 1 to 140000 ppm, more preferably 100 ppm to 20000 ppm, yet more preferably 350 ppm to 10000 ppm.

The proportion of $CO_2$ in the gas mixture $G_1$ may be determined by those skilled in the art with commercially available devices ($CO_2$ sensors) or IR spectroscopy for example as a matter of routine.

The process according to the invention is in particular carried out in an apparatus $V_1$. The apparatus $V_1$ is restricted only to the extent that it shall be suitable for carrying out the process according to the invention. In particular, an apparatus $V_1$ having the following components may be employed:

(i) at least one water absorption unit $W_{abs1}$ set up for contacting the moist gas mixture $G_1$ with the liquid absorption medium, in particular $A_1$, (ii) at least one water desorption unit $W_{des1}$ which comprises a heat exchanger $W_{x1}$ and which is set up for at least partially removing water from a liquid absorption medium, in particular $A_2$, (iii) and a circuit $U_1$, which connects the water absorption unit $W_{abs1}$ with the water desorption unit $W_{des1}$ and by means of which the liquid absorption medium, in particular $A_1/A_2$, may be circulated.

The water absorption unit $W_{abs1}$ in particular carries out the process according to the invention. Employable water absorption units $W_{abs1}$ include in particular the water absorbers known to those skilled in the art. Said absorbers are based on the principle of increasing the surface area of the liquid absorption medium, in particular $A_1$, and simultaneously achieving the longest possible residence time of the liquid absorption medium $A_1$ in the water absorber during absorption of water. It is, in particular, possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ falling-films, in particular shell and tube falling-films, as water absorbers. The water absorption unit $W_{abs1}$ may in particular also comprise an additional heat exchanger $W_{z1}$ set up such that the liquid absorption medium, in particular $A_1$ is coolable.

The water desorption unit $W_{des1}$, which comprises a heat exchanger $W_{x1}$ in particular carries out an optional step of the process according to the invention ["step b)", wherein in this context the process would be step a)]. The water desorption unit $W_{des1}$ is based on the principle of supplying heat to the water-laden liquid absorption medium $A_1$, increasing the surface area of the water-laden liquid absorption medium $A_1$ and simultaneously achieving the longest possible residence time of the water-laden liquid absorption medium $A_2$ in the water desorption unit $W_{des1}$.

Employable water desorption units $W_{des1}$ comprising a heat exchanger $W_{x1}$ include in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des1}$ comprising a heat exchanger $W_{x1}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ falling-films, in particular shell and tube falling-films, as water desorption unit $W_{des1}$.

Circuit $U_1$ in particular passes $A_2$ from step a) of the process according to the invention from the water absorption unit $W_{abs1}$ to the water desorption unit $W_{des1}$ and more preferably—in particular when the process according to the invention is carried out in continuous fashion—additionally passes $A_3$ from step b) of the process according to the invention from the water desorption unit $W_{des1}$ to the water absorption unit $W_{abs1}$.

The circuit $U_1$ is in particular a conduit, in particular selected from the group consisting of tube, hose.

In a further preferred embodiment the circuit $U_1$ also comprises a pump.

The contacting may be effected in any way known to those skilled in the art, in particular in a water absorption unit $W_{abs1}$. The contacting causes the absorption medium $A_1$ to at least partially absorb moisture, i.e. water, from the moist gas stream $G_1$.

It is preferable to cool the absorption medium $A_1$ during contacting of the moist gas mixture $G_1$ in order that as much moisture as possible is absorbed from the moist gas mixture $G_1$. This may be achieved, for example, via an additional heat exchanger $W_{z1}$ in the water absorption unit $W_{abs1}$. The temperature of the absorption medium $A_1$ during contacting of the moist gas mixture G is thus preferably in the range from 15° C. to 90° C., more preferably from 20° C. to 80° C., most preferably from 20° C. to 40° C.

In the process according to the invention the moist gas mixture $G_1$ is contacted with a liquid absorption medium $A_1$ which comprises a mixture of triethylene glycol and at least one salt S selected from the group consisting of $Q+A^-$, $Q^+(R^1O)_2PO_2^-$, $(Q^+)_2R^2OPO_3^{2-}$, $Q^+M^+R^3OPO_3^{2-}$. Here, $Q^+$ is a dialkylimidazolium cation in which the alkyl groups each independently of one another have 1 to 6 carbon atoms and $A^-$ is an anion selected from the group consisting of acetate, propionate, R'SO$_3^-$, HSO$_4^-$, R"SO$_4^-$, wherein R', R" are independently of one another an alkyl group having 1 to 6 carbon atoms, wherein $R^1$, $R^2$, $R^3$ are each independently of one another an alkyl group having 1 to 6 carbon atoms and $M^+$ is an alkali metal ion, preferably Li$^+$, K$^+$ or Na$^+$, yet more preferably K$^+$ or Na$^+$. However, according to the invention the salt S is not dimethylimidazolium methylsulfonate (which is of course also the case in the preferred embodiments of the invention).

In a preferred embodiment of the process according to the invention $Q^+$ is a dialkylimidazolium cation in which the alkyl groups each independently of one another have 1 to 4 carbon atoms and $R^1$, $R^2$, $R^3$ are each independently of one another methyl or ethyl and $A^-$ is selected from the group consisting of acetate, propionate R'SO$_3^-$, HSO$_4^-$, R"SO$_4^-$, wherein R', R" are independently of one another methyl or ethyl.

In a more preferred embodiment of the process according to the invention the salt S is selected from the group consisting of $Q^+A^-$, $Q^+(R^1O)_2PO_2^-$ and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, R'SO$_3^-$, R"SO$_4^-$, wherein R', R" are independently of one another an alkyl group having 1 to 4 carbon atoms, wherein $R^1$ is methyl or ethyl.

In a more preferred embodiment of the process according to the invention the salt S is selected from the group consisting of $Q^+A^-$, $Q^+(R^1O)_2PO_2^-$ and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, R'SO$_3^-$, R"SO$_4^-$, wherein R', R" are independently of one another an alkyl group having 1 to 2 carbon atoms, wherein $R^1$ is methyl or ethyl.

In a yet more preferred embodiment of the process according to the invention the salt S is selected from the group consisting of $Q^+A^-$, $Q^+(R^1O)_2PO_2^-$ and $Q^+$ is selected from the group consisting of 1,3-dimethylimidazolium cation, 1,3-diethylimidazolium cation, 1-ethyl-3-methylimidazolium cation and $A^-$ is an anion selected from the group consisting of acetate, propionate, MeSO$_3^-$, EtSO$_3^-$, MeSO$_4^-$, EtSO$_4^-$ and $R^1$ is methyl or ethyl.

In a yet still more preferred embodiment of the process according to the invention the salt S is selected from the group consisting of $Q^+A^-$, $Q^+(R^1O)_2PO_2^-$ and $Q^+$ is selected from the group consisting of 1,3-dimethylimidazolium cation, 1,3-diethylimidazolium cation, 1-ethyl-3-methylimidazolium cation and $A^-$ is an anion selected from the group consisting of acetate, propionate, MeSO$_3^-$, EtSO$_4^-$ and $R^1$ is methyl or ethyl, yet more preferably $R^1$=ethyl.

In a particularly preferred embodiment of the process according to the invention $Q^+$ is selected from the group consisting of 1,3-dimethylimidazolium cation, 1,3-diethylimidazolium cation, 1-ethyl-3-methylimidazolium cation and $A^-$ is an anion selected from the group consisting of acetate, propionate. It is yet still more preferable if $Q^+$ is then a 1,3-dimethylimidazolium cation.

This is because in addition to the previously discussed effect yet another positive effect of the process according to the invention is observed in the case of the acetates and propionates: When $CO_2$ is present in the moist gas stream acetates and propionates precipitate which results in undesired deposits in the apparatus. It has now been found that this propensity is negated for these salts S when they are present in a mixture with triethylene glycol. This observation was likewise entirely surprising.

The liquid absorption medium $A_1$ may be employed in the process according to the invention in the form of the pure mixture of triethylene glycol and the salts S. Alternatively and more preferably the liquid absorption medium $A_1$ is an aqueous solution. It is preferable when in said aqueous solution the total weight of triethylene glycol and all salts S is at least 70 wt % based on the total weight of the aqueous solution. In said aqueous solution the total weight of triethylene glycol and all salts S is yet more preferably at least 80 wt % based on the total weight of the aqueous solution, yet more preferably 85 wt %, yet more preferably 90 wt %, yet still more preferably 99 wt %.

In the process according to the invention the ratio of triethylene glycol to the salts S in the absorption medium $A_1$ is not further restricted. However, it is preferable to employ in the process according to the invention an absorption medium $A_1$ in which the ratio of the total weight of the triethylene glycol to the total weight of all salts S is in the range 1:9 to 9:1, more preferably 2:8 to 8:2, yet more preferably 3:7 to 7:3, yet still more preferably 3:7 to 6:4, yet still more preferably 3:7 to 1:1, most preferably 3:7 to 4:6, with very greatest preference 3:7.

The gas mixture $G_2$ obtained in the process according to the invention and having a relatively low water content compared to the moist gas mixture $G_1$ then represents the dehumidified gas stream which, depending on the application, can be returned to living or working spaces in the form of dehumidified air or in the case of natural gas can be supplied to power generation.

The liquid absorption medium $A_2$ obtained in the process according to the invention has an elevated water content compared to the liquid absorption medium $A_1$; it will be appreciated that in terms of the salts S comprised by it and in terms of the triethylene glycol comprised by it $A_2$ is identical to $A_1$ and is preferably distinguished therefrom only by its water content.

An optional additional step of the process according to the invention ["optional step b)", wherein the process according to the invention is to be understood as "step a)"] then effects the at least partial removal of water from the liquid absorption medium $A_2$ to obtain a liquid absorption medium $A_3$ having a relatively low water content compared to the liquid absorption medium $A_2$. Heat is additionally supplied to the liquid absorption medium $A_2$ here. The supply of heat and the at least partial removal may be effected in any way known to those skilled in the art, in particular in a water desorption unit $W_{des1}$ comprising a heat exchanger $W_{x1}$. The at least partial removal of water from the liquid absorption medium $A_2$ affords a liquid absorption medium $A_3$ having a relatively low water content compared to the liquid absorption medium $A_2$.

It will be appreciated that in terms of the salts S comprised by it and in terms of the triethylene glycol comprised by it $A_3$ is identical to the $A_2$ and is preferably distinguished therefrom only by its water content.

In a further preferred embodiment the process according to the invention is carried out in continuous fashion. This means in particular that following step b) steps a) and b) are performed at least one further time and the liquid absorption medium $A_1$ employed in the step a) additionally performed in each case is at least partially the liquid absorption medium $A_3$ obtained from the step b) performed immediately beforehand. This means that in particular the water content of the liquid absorption medium $A_1$ employed in the step a) additionally performed in each case and of the liquid absorption medium $A_3$ from the step b) performed immediately beforehand is identical.

It is yet more preferable when in this embodiment liquid absorption medium $A_2$ is supplied with heat from liquid absorption medium $A_3$. This may be carried out in an additional heat exchanger $W_{y1}$, in particular selected from the group consisting of shell and tube heat exchangers and plate and frame heat exchangers. This makes it possible to carry out the process according to the invention in a particularly energy efficient fashion.

The invention also relates in a further aspect to an apparatus $V_2$ for dehumidifying a moist gas mixture which in particular comprises $CO_2$, comprising the components
(i) a liquid absorption medium $A_{1*}$ which comprises a mixture of triethylene glycol and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$.
(ii) at least one water absorption unit $W_{abs2}$ set up for contacting the moist gas mixture with the liquid absorption medium $A_{1*}$,
(iii) at least one water desorption unit $W_{des2}$ which comprises a heat exchanger $W_{x2}$ and is set up for at least partially removing water from a liquid absorption medium $A_{1*}$,
(iv) and a circuit $U_2$ which connects the water absorption unit $W_{abs2}$ with the water desorption unit $W_{des2}$ and by means of which the liquid absorption medium $A_{1*}$ may be circulated,
characterized in that
$Q^+$ is a dialkylimidazolium cation in which the alkyl groups each independently of one another have 1 to 6 carbon atoms,
wherein $A^-$ is an anion selected from the group consisting of acetate, propionate, $R'SO_3^-$, $HSO_4^-$, $R''SO_4^-$, wherein R', R'' are independently of one another an alkyl group having 1 to 6 carbon atoms,
wherein $R^1$, $R^2$, $R^3$ are each independently of one another an alkyl group having 1 to 6 carbon atoms and $M^+$ is an alkali metal ion, preferably $Li^+$, $K^+$ or $Na^+$, yet more preferably $K^+$ or $Na^+$, with the proviso that the salt S is not dimethylimidazolium methylsulfonate.

The apparatus according to the invention $V_2$ is suitable for dehumidification of a moist gas mixture, in particular comprising $CO_2$, preferably comprising $CO_2$ in a proportion of 1 to 140000 ppm, more preferably 100 ppm to 20000 ppm, yet more preferably 350 ppm to 10000 ppm.

The apparatus $V_2$ according to the invention comprises the following components:

As a first component the apparatus according to the invention $V_2$ comprises a liquid absorption medium $A_{1*}$ which comprises a mixture of triethylene glycol and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein $Q^+$ is a dialkylimidazolium cation in which the alkyl groups each independently of one another have 1 to 6 carbon atoms, wherein $A^-$ is an anion selected from the group consisting of acetate, propionate, $R'SO_3^-$, $HSO_4^-$, $R''SO_4^-$, wherein R', R'' are independently of one another an alkyl group having 1 to 6 carbon atoms,
wherein $R^1$, $R^2$, $R^3$ are each independently of one another an alkyl group having 1 to 6 carbon atoms and M+ is an alkali metal ion, preferably $Li^+$, $K^+$ or $Na^+$, yet more preferably $K^+$ or $Na^+$, with the proviso that the salt S is not dimethylimidazolium methylsulfonate.

In a preferred embodiment of the apparatus $V_2$ according to the invention in $A_{1*}$, $Q_+$ is a dialkylimidazolium cation in which the alkyl groups each independently of one another have 1 to 4 carbon atoms and $R^1$, $R^2$, $R^3$ are each independently of one another methyl or ethyl and $A^-$ is selected from the group consisting of acetate, propionate $R'SO_3^-$, $HSO_4^-$, $R''SO_4^-$, wherein R', R'' are each independently of one another methyl or ethyl.

In a more preferred embodiment of the apparatus $V_2$ according to the invention the salt S in $A_{1*}$ is selected from the group consisting of $Q^+A^-$, $Q^+(R^1O)_2PO_2^-$, and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, $R'SO_3^-$, $R''SO_4^-$, wherein R', R'' are independently of one another an alkyl group having 1 to 4 carbon atoms, wherein $R^1$ is methyl or ethyl.

In a more preferred embodiment of the apparatus $V_2$ according to the invention the salt S in A1* is selected from the group consisting of $Q^+A^-$, $Q^+(R^1O)_2PO_2^-$, and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, $R'SO_3^-$, $R''SO_4^-$, wherein R', R'' are independently of one another an alkyl group having 1 to 2 carbon atoms, wherein $R^1$ is methyl or ethyl.

In a yet more preferred embodiment of the apparatus $V_2$ according to the invention the salt S in $A_{1*}$ is selected from the group consisting of $Q^+A^-$, $Q^+(R^1O)_2PO_2^-$, and $Q^+$ is selected from the group consisting of 1,3-dimethylimidazolium cation, 1,3-diethylimidazolium cation, 1-ethyl-3-methylimidazolium cation and $A^-$ is an anion selected from the group consisting of acetate, propionate, $MeSO_3^-$, $EtSO_3^-$, $MeSO_4^-$, $EtSO_4^-$ and $R^1$ is methyl or ethyl.

In a yet still more preferred embodiment of the apparatus $V_2$ according to the invention the salt S in $A_{1*}$ is selected from the group consisting of $Q^+A^-$, $Q^+(R^1O)_2PO_2^-$, and $Q^+$ is selected from the group consisting of 1,3-dimethylimidazolium cation, 1,3-diethylimidazolium cation, 1-ethyl-3-methylimidazolium cation and $A^-$ is an anion selected from the group consisting of acetate, propionate, $MeSO_3^-$, $EtSO_4^-$, and $R^1$ is methyl or ethyl, yet more preferably $R^1$=ethyl.

In a particularly preferred embodiment of the apparatus $V_2$ according to the invention $Q^+$ is selected from the group consisting of 1,3-dimethylimidazolium cation, 1,3-diethylimidazolium cation, 1-ethyl-3-methylimidazolium cation, and $A^-$ is an anion selected from the group consisting of acetate, propionate. It is yet still more preferable if $Q^+$ is then a 1,3-dimethylimidazolium cation.

The liquid absorption medium $A_{1*}$ may be employed in the form of the pure mixture of triethylene glycol and all salts S. Alternatively and more preferably the liquid absorption medium $A_{1*}$ is an aqueous solution in which the total weight of triethylene glycol and all salts S is preferably at least 70 wt % based on the total weight of the aqueous solution. It is yet more preferable when the total weight of triethylene glycol and all salts S in $A_{1*}$ is at least 80 wt % based on the total weight of the aqueous solution, yet more preferably 85 wt %, yet more preferably 90 wt %, yet still more preferably 99 wt %.

In the liquid absorption medium $A_{1*}$ the ratio of triethylene glycol to the salts S in the absorption medium is not further restricted. However, it is preferable to employ in the apparatus $V_2$ according to the invention an absorption medium $A_{1*}$ in which the ratio of the total weight of the triethylene glycol to the total weight of all salts S is in the range 1:9 to 9:1, more preferably 2:8 to 8:2, yet more preferably 3:7 to 7:3, yet still more preferably 3:7 to 6:4, yet still more preferably 3:7 to 1:1, most preferably 3:7 to 4:6, with very greatest preference 3:7.

As a second component the apparatus $V_2$ according to the invention comprises a water absorption unit $W_{abs2}$ set up for contacting the moist gas mixture with the liquid absorption medium $A_{1*}$. The water absorption unit $W_{abs2}$ may in particular comprise an additional heat exchanger $W_{z2}$ set up such that the liquid absorption medium $A_{1*}$ is coolable. Employable water absorption units $W_{abs2}$ of this kind include in particular the water absorbers known to those skilled in the art. Said absorbers are based on the principle of increasing the surface area of the liquid absorption medium $A_{1*}$ and simultaneously achieving the longest possible residence time of the liquid absorption medium $A_{1*}$ in the water absorber during absorption of the water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ falling-films, in particular shell and tube falling-films, as water absorbers.

As a third component the apparatus $V_2$ according to the invention comprises a water desorption unit $W_{des2}$ which comprises a heat exchanger $W_{x2}$ and is set up for at least partially removing water from the liquid absorption medium $A_{1*}$. Particularly the combinations of heat exchanger and water desorber known to those skilled in the art may be employed therefor. The water desorption unit $W_{des2}$ is based on the principle of supplying heat to the liquid absorption medium $A_{1*}$, increasing the surface area of the liquid absorption medium $A_{1*}$ and simultaneously achieving the longest possible residence time of the liquid absorption medium $A_{1*}$ in the water desorption unit.

Employable water desorption units $W_{des2}$ comprising a heat exchanger $W_{x2}$ include in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des2}$ comprising a heat exchanger $W_{x2}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des2}$ falling-films, in particular shell and tube falling-films.

As a fourth component the apparatus $V_2$ according to the invention comprises a circuit $U_2$ which connects the water absorption unit $W_{abs2}$ with the water desorption unit $W_{des2}$ and by means of which the liquid absorption medium $A_{1*}$ may be circulated. The circuit $U_2$ is preferably a conduit, yet more preferably selected from the group consisting of tube, hose. In a further preferred embodiment the circuit $U_2$ also comprises a pump.

In a preferred embodiment the apparatus $V_2$ comprises a further heat exchanger $W_{y2}$ (additional to the heat exchanger $W_{x2}$ comprised in the water desorption unit $W_{des2}$). The heat exchanger $W_{y2}$ is set up such that liquid absorption medium $A_{1*}$ sent from the water absorption unit $W_{abs2}$ to the water desorption unit $W_{des2}$ may be supplied with heat from liquid absorption medium $A_{1*}$, said medium being conducted away from the water desorption unit $W_{des2}$. This can be ensured in particular by employing as heat exchanger $W_{y2}$ in particular a heat exchanger selected from shell and tube heat exchangers, plate and frame heat exchangers.

In a further preferred embodiment the apparatus $V_2$ is part of an absorption chiller (synonymous with "absorption heat pump" according to the invention). This absorption chiller then comprises as further components a condenser, an evaporator and a coolant, wherein the coolant is water.

The condenser is in particular connected to the water desorption unit $W_{des2}$ via a conduit and is set up for condensing water at least partially removed from the liquid absorption medium $A_{1*}$ in the water desorption unit $W_{des2}$. The condenser preferably also comprises a cooling water circuit.

The evaporator is in particular connected to the condenser via a conduit (which may comprise a throttling means) and connected to the water absorption unit $W_{abs2}$ via a further conduit and is set up for evaporating condensed water from the condenser. The evaporator preferably also comprises a pressure of <1 bar, more preferably <0.1 bar, to permit evaporation of the condensed water at the lowest possible temperatures. The evaporator may further preferably additionally comprise an apparatus from which heat may be drawn and so that the condensed water may be evaporated (for example a coolant conduit in which coolant is passed into the space in which water is evaporated).

Finally, the present invention also relates to the absorption medium $A_{1*}$ itself, wherein the absorption medium $A_{1*}$ comprises a mixture of triethylene glycol and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein $Q^+$ is a dialkylimidazolium cation in which the alkyl groups each independently of one another have 1 to 6 carbon atoms, wherein $A^-$ is an anion selected from the group consisting of acetate, propionate, $R'SO_3^-$, $HSO_4^-$, $R''SO_4^-$, wherein R', R" are independently of one another an alkyl group having 1 to 6 carbon atoms, wherein $R^1$, $R^2$, $R^3$ are each independently of one another an alkyl group having 1 to 6 carbon atoms and $M^+$ is an alkali metal ion, preferably $Li^+$, $K^+$ or $Na^+$, yet more preferably $K^+$ or $Na^+$, with the proviso that the salt S is not dimethylimidazolium methylsulfonate.

In a preferred embodiment of the absorption medium $A_{1*}$ according to the invention $Q_+$ therein is a dialkylimidazolium cation in which the alkyl groups each independently of one another have 1 to 4 carbon atoms and $R^1$, $R^2$, $R^3$ are each independently of one another methyl or ethyl and $A^-$ is selected from the group consisting of acetate, propionate $R'SO_3^-$, $HSO_4^-$, $R''SO_4^-$, wherein R', R" are each independently of one another methyl or ethyl.

In a more preferred embodiment of the absorption medium $A_{1*}$ according to the invention the salt S is selected from the group consisting of $Q^+A^-$, $Q^+(R^1O)_2PO_2^-$, and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, $R'SO_3^-$, $R''SO_4^-$, wherein R', R" are independently of one another an alkyl group having 1 to 4 carbon atoms, wherein $R^1$ is methyl or ethyl.

In a more preferred embodiment of the absorption medium $A_{1*}$ according to the invention the salt S therein is selected from the group consisting of $Q^+A^-$, $Q^+(R^1O)_2PO_2^-$, and $Q^+$ is a dialkylimidazolium cation in which the alkyl groups are each independently of one another methyl, ethyl, n-propyl, iso-propyl or n-butyl and $A^-$ is an anion selected from the group consisting of acetate, propionate, $R'SO_3^-$, R"SO$_4^-$, wherein R', R" are independently of one another an alkyl group having 1 to 2 carbon atoms, wherein R' is methyl or ethyl.

In a yet more preferred embodiment of the absorption medium A$_{1*}$ according to the invention the salt S therein is selected from the group consisting of Q$^+$A$^-$, Q$^+$(R$^1$O)$_2$PO$_2^-$ and Q$^+$ is selected from the group consisting of 1,3-dimethylimidazolium cation, 1,3-diethylimidazolium cation, 1-ethyl-3-methylimidazolium cation, and A$^-$ is an anion selected from the group consisting of acetate, propionate, MeSO$_3^-$, EtSO$_3^-$, MeSO$_4^-$, EtSO$_4^-$, and R$^1$ is methyl or ethyl.

In a yet still more preferred embodiment of the absorption medium A$_{1*}$ according to the invention the salt S therein is selected from the group consisting of Q$^+$A$^-$, Q$^+$(R$^1$O)$_2$PO$_2^-$ and Q$^+$ is selected from the group consisting of 1,3-dimethylimidazolium cation, 1,3-diethylimidazolium cation, 1-ethyl-3-methylimidazolium cation and A$^-$ is an anion selected from the group consisting of acetate, propionate, MeSO$_3^-$, EtSO$_4^-$, and R$^1$ is methyl or ethyl, yet more preferably R$^1$=ethyl.

In a particularly preferred embodiment of the absorption medium A$_{1*}$ according to the invention S therein is a salt having the structure Q$^+$A$^-$, wherein A$^-$ is an anion selected from the group consisting of acetate, propionate.

The liquid absorption medium A$_{1*}$ may be employed in the form of the pure mixture of triethylene glycol and all salts S. Alternatively and more preferably the liquid absorption medium A$_{1*}$ is an aqueous solution in which the total weight of triethylene glycol and all salts S is preferably at least 70 wt % based on the total weight of the aqueous solution. It is yet more preferable when in A$_{1*}$ the total weight of triethylene glycol and all salts S is at least 80 wt % based on the total weight of the aqueous solution, yet more preferably 85 wt %, yet more preferably 90 wt %, yet still more preferably 99 wt %.

In the absorption medium A$_{1*}$ according to the invention the ratio of triethylene glycol to the salts S in the absorption medium is not further restricted. However, in the absorption medium A$_{1*}$ the ratio of the total weight of the triethylene glycol to the total weight of all salts S is preferably in the range 1:9 to 9:1, more preferably 2:8 to 8:2, yet more preferably 3:7 to 7:3, yet still more preferably 3:7 to 6:4, yet still more preferably 3:7 to 1:1, most preferably 3:7 to 4:6, with very greatest preference 3:7.

The FIGS. 1 and 2 elucidated hereinbelow show preferred embodiments of the process according to the invention and the apparatus according to the invention.

FIG. 1 (abbreviated to "FIG. 1") shows an embodiment of the apparatus V$_2$/V$_1$ according to the invention.

The apparatus V$_1$ shown in FIG. 1 comprises a water absorption unit W$_{abs1}$ <103> (with optional additional heat exchanger W$_{z1}$ <104>) to which a conduit <101> leads and from which a conduit <102> leads away, a water desorption unit W$_{des1}$ which comprises a heat exchanger W$_{x1}$ <108> and a water desorber <109> and to which conduit <111> leads and from which conduits <110>, <112> and <113> lead away, and a circuit U$_2$ formed from conduits <106>, <111> and <113> or <106>, <111>, <112> and <105> (in each case optionally with conduit <114>). The apparatus in FIG. 1 may also optionally comprise a further heat exchanger W$_{y1}$ <107> to which conduits <106> and <112> lead and from which conduits <105> and <111> lead away. In addition the apparatus V$_1$ also comprises a liquid absorption medium A$_1$. Said medium is located in one or more of the abovementioned components water absorption unit W$_{abs1}$, water desorption unit W$_{des1}$, circuit U$_1$. The water absorption unit W$_{abs1}$ <103> may optionally also comprise an additional heat exchanger W$_{z1}$ <104> with which the liquid absorption medium A$_1$ may be brought to a temperature of 30° C. to 100° C., preferably 30° C. to 60° C., more preferably 30° C. to 50° C., yet more preferably 40° C. to 50° C. Optionally, circuit U$_2$ may also additionally comprise a pump for conveying the liquid absorption medium A$_1$.

The process according to the invention will now be illustratively described with reference to apparatus V$_1$ using FIG. 1:

A stream of a moist gas mixture G$_1$ having a temperature of 30° C. to 100° C. (said stream may for example be moist air, moist natural gas or moist gas mixture—see also FIG. 2 with regard to this option) is supplied via conduit <101> to a water absorption unit W$_{abs1}$ <103> and contacted there with the liquid absorption medium A$_1$ supplied to the water absorption unit W$_{abs1}$ <103> via the conduit <105> or via the conduit <113>. The water absorption unit W$_{abs1}$ <103> may be any of the water absorbers recited hereinabove for W$_{abs1}$, in particular a falling-film. Contacting, in the water absorption unit W$_{abs1}$ <103>, gas mixture G$_1$ supplied via conduit <101> with the liquid absorption medium A$_1$ supplied via the conduit <105> or via the conduit <113> affords a liquid absorption medium A$_2$ having an elevated water content compared to the liquid absorption medium A$_1$ and a stream of a gas mixture G$_2$ discharged via the conduit <102>, wherein G$_2$ has a relatively low water content compared to the moist gas mixture G$_1$. Depending on the application G$_2$ is in particular dehumidified natural gas. The water absorption unit W$_{abs1}$ <103> may optionally also comprise an additional heat exchanger W$_{z1}$ <104> with which the liquid absorption medium A$_1$ may be brought to a temperature of 30° C. to 100° C., preferably 30° C. to 60° C., more preferably 30° C. to 50° C., yet more preferably 40° C. to 50° C. Preferably via the conduits <106>, <111> and the heat exchanger W$_{y1}$ <107> (or, when heat exchanger W$_{y1}$ <107> is not employed, via conduits <106>, <111> and <114>) the liquid absorption medium A$_2$ is then passed to the water desorption unit W$_{des1}$ composed of the heat exchanger W$_{x1}$ <108> and the water desorber <109>. The water-laden liquid absorption medium A$_2$ may additionally be supplied with heat in the optional heat exchanger W$_{y1}$ <107>. The at least partial removal of water from the liquid absorption medium A$_2$ is then carried out in the water desorber <109> to afford a liquid absorption medium A$_3$ having a relatively low water content compared to the liquid absorption medium A$_2$. The water removed is then discharged from the water desorber <109> as liquid or vapour, preferably as vapour, via conduit <110>. The liquid absorption medium A$_3$ is then discharged from the water desorber <109> and returned to the water absorption unit W$_{abs1}$ <103>. This may be carried out directly, i.e. via the conduit <113> which is shown in dashed form in FIG. 1. Alternatively and preferably the liquid absorption medium A$_3$ may also be supplied via the conduit <112> to the optional heat exchanger W$_{y1}$ <107> in which the liquid absorption medium A$_2$ supplied via conduit <106> to the optional heat exchanger W$_{y1}$ <107> is then supplied with heat from the liquid absorption medium A$_3$ supplied via conduit <112> to the optional heat exchanger W$_{y1}$ <107>. Once the concentrated liquid absorption medium A$_3$ has been supplied to the water absorption unit W$_{abs1}$ via conduit <105> or <113> said medium is reused as A$_1$ for at least partially dehumidifying the gas stream in a new cycle.

Figure 2:
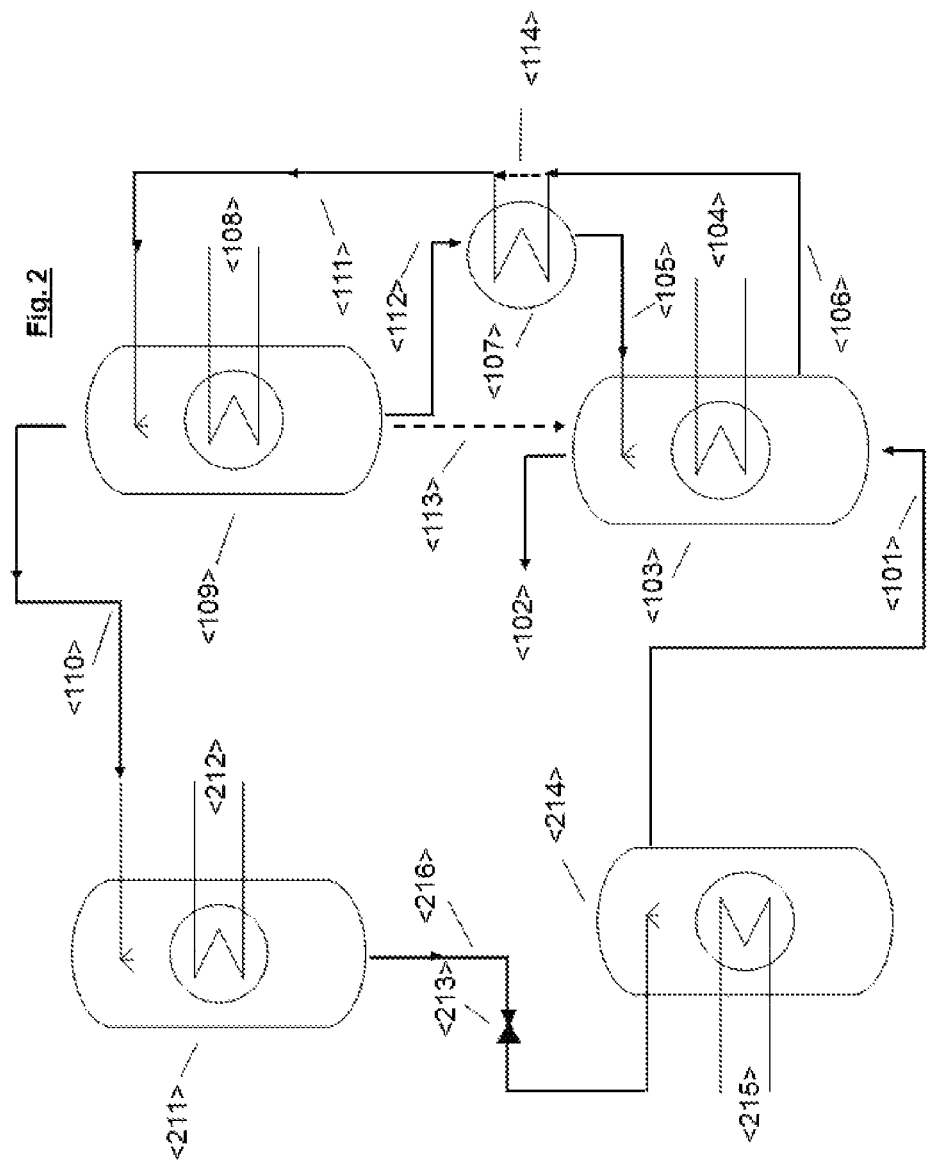
FIG. 2.

FIG. 2 (abbreviated as "FIG. 2") shows in schematic fashion an absorption chiller into which an apparatus V$_2$ is integrated. The constituents <101> to <114> are shown as for the apparatus $V_2$ described in FIG. 1. Additionally, the absorption chiller in FIG. 2 also comprises a condenser <211> which is connected to the water desorption unit $W_{des2}$ <109> via the conduit <110> and is set up for condensing water at least partially removed from the liquid absorption medium $A_{1*}$ in the water desorption unit $W_{des2}$. Condenser <211> preferably also comprises a heat exchanger <212> with which cooling water may be supplied.

The absorption chiller shown in FIG. 2 also comprises an evaporator <214> connected to the condenser <211> via a conduit <216> (which may optionally comprise a throttling means <213>) and connected via the conduit <101> with the water absorption unit $W_{abs2}$. The evaporator <214> is set up to evaporate condensed water from the condenser. Additionally, the evaporator <214> can further preferably also comprise a heat exchanger <215> which supplies a medium, heat being drawn off from the medium to thus evaporate the condensed water (for example a coolant conduit with, in particular, water as coolant, this coolant being passed into the evaporator <214>). In an embodiment of the process according to the invention (described hereinbelow with reference to apparatus $V_1$ using FIG. 2) moist gas mixture G originating from evaporator <214> is passed via the conduit <101> to the water absorption unit $W_{abs1}$ <103>. The water removed in water desorption unit $W_{des1}$ is supplied via the conduit <110> to the condenser <211> in which said water is recondensed. A cooling water circuit as heat exchanger <212> installed in the condenser is optionally likewise used therefor. The condensed water is then supplied via a conduit <216> to the evaporator <214> in which the evaporation of water is effected in particular at low pressures, thus bringing about a cooling effect. This may optionally also be effected using a throttling means <213>. This achieves a cooling action in the evaporator <214> and, for example, coolant may be cooled via the heat exchanger <215>. The water vapour generated is then returned to the water absorption unit $W_{abs1}$ <103> via conduit <101>.

The examples which follow are intended to elucidate the present invention without limiting said invention in any way.

EXAMPLES

1. Materials

The ionic liquids used were obtained from Sigma-Aldrich or by procedures described in the prior art (e.g. summarized in DE 10 2014 214 670 A1). The $CO_2$ content of the gas stream was determined by infrared spectroscopy.

2. Viscosity Measurements

The viscosity of the following ionic liquids (comparative experiments: pure; inventive examples in admixture with 30 wt % of triethylene glycol) was measured according to DIN 54453. The results are shown in Table 1 which follows.

TABLE 1

| Ionic liquid tested | Pure (>99%) (comparative) | Mixture with 30 wt % of TEG (inventive examples) |
|---|---|---|
| 1,3-dimethylimidazolium propionate | 46.1 | 25.8 |
| 1-ethyl-3-methylimidazolium diethylphosphate | 135.8 | 36.6 |
| 1-ethyl-3-methylimidazolium methylsulfonate | 40.5 | 14.4 |
| 1-ethyl-3-methyl-imidazolium acetate | 43.0 | 26.3 |
| 1,3-dimethylimidazolium acetate | 36.6 | 24.4 |
| 1,3-dimethylimidazolium diethylphosphate | 134.1 | 42.3 |

It is apparent from the table that for the mixtures comprising 30 wt % of TEG according to the inventive examples a lower viscosity compared to the pure ionic liquid was achieved for all ionic liquids. The mixtures according to the inventive examples are therefore much more suitable for use for instance in dehumidification of gas streams than the pure substances.

3. Experiments Concerning Gas Streams Comprising $CO_2$ 100 mL of the ionic liquids listed in Table 2, in pure form and in admixture with 30 wt % of triethylene glycol respectively, were contacted with a gas stream comprising 140000 ppm of $CO_2$ in a bubble cell reaction vessel comprising a frit at 40° C. for 1 h. The results observed are summarized in Table 2.

TABLE 2

| Ionic liquid tested | Pure | Mixture with 30 wt % of TEG |
|---|---|---|
| 1,3-dimethylimidazolium propionate | deposit | no deposit |
| 1,3-dimethylimidazolium acetate | deposit | no deposit |
| 1-ethyl-3-methylimidazolium chloride | deposit | deposit |
| 1,3-dimethylimidazolium chloride | deposit | deposit |
| 1,3-dimethylimidazolium methyl sulphonate | deposit | deposit |

It is apparent from the results according to table 2, that precipitation of the ionic liquids upon contact with $CO_2$ was prevented by addition of triethylene glycol only in the case of MMIM Ac and MMIM Prop.

All references cited herein are fully incorporated by reference. Having now fully described the invention, it will be understood by those of skill in the art that the invention may be practiced within a wide and equivalent range of conditions, parameters and the like, without affecting the spirit or scope of the invention.

What is claimed is:

1. A process for dehumidifing a moist gas mixture $G_1$, wherein the moist gas mixture $G_1$ comprises $CO_2$, said process comprising: contacting the moist gas mixture $G_1$ with a liquid absorption medium $A_1$, wherein $A_1$ comprises a mixture of triethylene glycol and at least one salt S selected from the group consisting of: $Q^+A^-$; to obtain a gas mixture $G_2$, which has a lower water content compared to moist gas mixture $G_1$, and a liquid absorption medium $A_2$, which has an elevated water content compared to the liquid absorption medium $A_1$;, wherein:
    a) $Q^+$ is selected from the group consisting of 1,3-dimethylimidazolium cation, 1,3-diethylimidazolium cation, and 1-ethyl-3-methylimidazolium cation; and
    b) $A^-$ is an anion selected from the group consisting of acetate and propionate.

2. The process of claim 1, wherein the liquid absorption medium $A_1$ is an aqueous solution in which the total weight of triethylene glycol and all salts S is at least 70 wt % based on the total weight of the aqueous solution.

3. The process of claim 1, wherein, in the liquid absorption medium $A_1$, the ratio of the weight of the triethylene glycol to the total weight of all salts S is in the range 1:9 to 9:1.

4. The process of claim 1, wherein the proportion of $CO_2$ in the moist gas mixture $G_1$ is in the range 1 ppm to 140000 ppm.

5. An absorption medium consisting of a mixture of triethylene glycol and at least one salt S selected from the group consisting of: $Q^+A^-$, wherein:

a) $Q^+$ is selected from the group consisting of 1,3-dimethylimidazolium cation, 1,3-diethylimidazolium cation, and 1-ethyl-3-methylimidazolium cation; and b) $A^-$ is an anion selected from the group consisting of acetate and propionate.

6. The absorption medium of claim 5, wherein said absorption medium is an aqueous solution in which the total weight of triethylene glycol and all salts S is at least 70 wt % based on the total weight of the aqueous solution.

7. The absorption medium of claim 5, wherein the ratio of the weight of the triethylene glycol to the total weight of all salts S is in the range 1:9 to 9:1.

* * * * *